Figure 1:
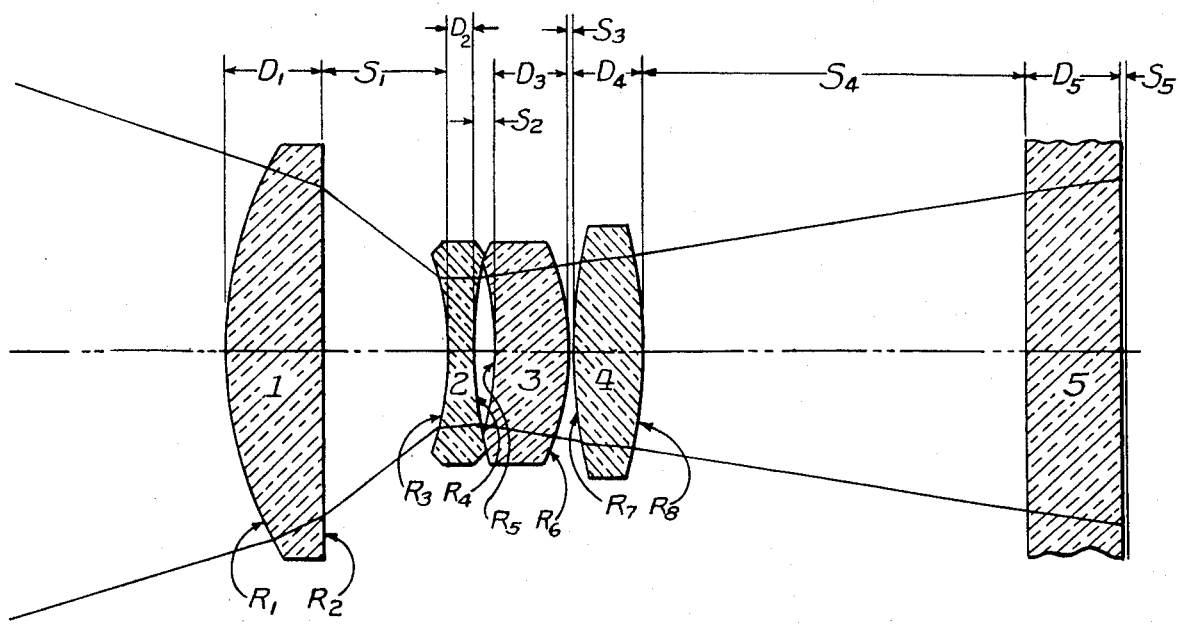

3,998,529
OR 3,998,529

United States Patent [19]
Fleischman

[11] 3,998,529
[45] Dec. 21, 1976

[54] MICROFILM RECORDER LENS
[75] Inventor: Andor A. Fleischman, Northbrook, Ill.
[73] Assignee: Bell & Howell Company, Chicago, Ill.
[22] Filed: Aug. 13, 1975
[21] Appl. No.: 604,370
[52] U.S. Cl. .................... 350/216; 350/220
[51] Int. Cl.² ............................ G02B 11/30
[58] Field of Search .............. 350/216, 220
[56] References Cited
UNITED STATES PATENTS 2,502,543  4/1950  Warmisham ............... 350/220
2,893,290  7/1959  Miles ...................... 350/220
3,011,402  12/1961  Johnson .................. 350/220
3,020,804  2/1962  Cox et al. ................ 350/220

Primary Examiner—John K. Corbin
Assistant Examiner—Conrad Clark
Attorney, Agent, or Firm—John E. Peele, Jr.

[57] ABSTRACT

This invention relates to a simplified, and therefore less costly to manufacture, optical system for efficiently forming microimages onto an image plane.

1 Claim, 9 Drawing Figures

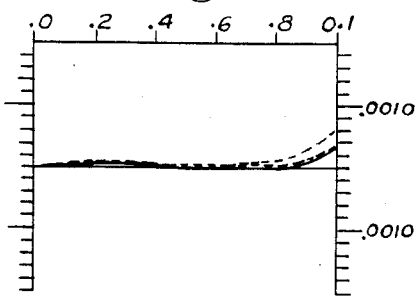
Fig.2a.
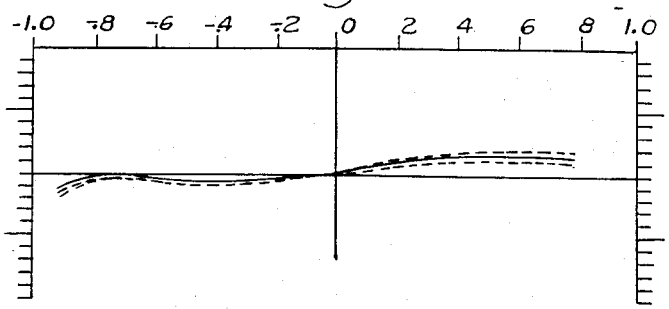
Fig.2b.
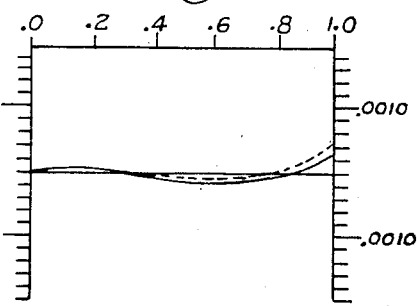
Fig.2c.
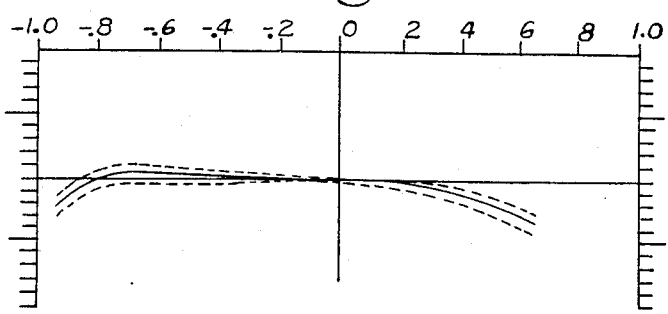
Fig.2d.
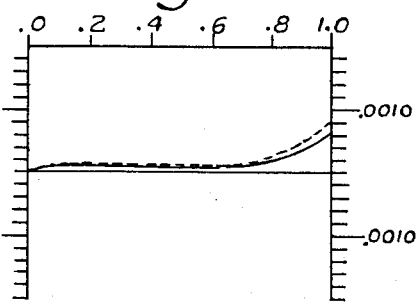
Fig.2e.
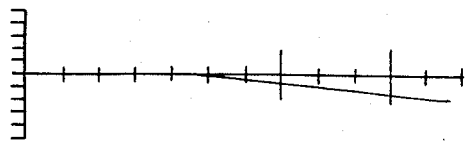
Fig.2f.
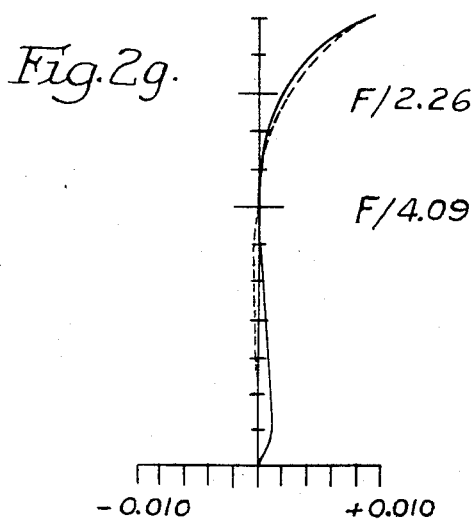
Fig.2g.  F/2.26  F/4.09
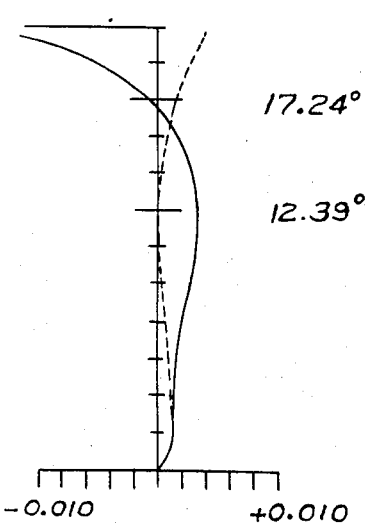
Fig.2h.  17.24°  12.39°

MICROFILM RECORDER LENS

This invention relates to an improved optical system primarily intended for use in efficiently imaging images onto an image plane of a microfilm or microfiche recorder.

Optical systems for reducing material to be copies to microfilm have been designed for transmitting images onto a film plane, which may be photographic, electrostatic or the like imaging material for making a record on the microfilm. Generally, these optical systems have required six or more elements to obtain high imaging performance in a relatively high speed, short focal length lens design. Because these optical systems are intended for use in mass-produced instruments, such as microfilm or microfiche readers and recorders, simplicity of design and lowest possible cost are desired while maintaining optimum performance as suggested by resolution and contrast.

The optical design of this invention obtains a simpler optical system by using fewer elements which enable the cost of manufacturing to be reduced. This advantageous design maintains performance and optical characteristics comparable to existing optical designs for reducing original material to microimages in the range of 43 times smaller than the original image size.

An object of the invention is to provide a relatively large aperture optical system for imaging microimages onto a film plane with optimum performance.

Other objects and advantages of the invention will become apparent from the detailed description which follows when taken in conjunction with the accompanying drawings in which:

FIG. 1 is a diagrammatic sectional view of a preferred optical system according to the present invention; and FIGS. 2a to 2h are graphical representations of the various aberrations of the lens system shown in FIG. 1 and having the design data given in Table 1.

Referring to the drawings, an optical system is shown for reducing images of original materials for recording onto microfilm or microfiche at an image plane which may be photographic, electrostatic or the like materials for making a permanent subsequently retrievable record of the original. Typically, the original is to be significantly reduced from the original size by approximately 42 times, which is recognized as one of the standard working ratios for microimaging. For efficient retrieval, optimum recording performance is desired since subsequent enlargement of the image will be at a similar reproduction ratio.

In this preferred embodiment of a lens design to obtain this significant image reduction, a relatively short focal length of 20mm is accomplished at a relatively large effective aperture of f/2.8. The lens design provides high performance over the entire field of view for an image of 12.1 mm diagonal for which it is designed. As designed, the resolution is at least 100 line per millimeter.

The optical system has an arrangement of elements with the first element $L_1$, starting at the ray entrance side of the system as shown in FIG. 1, being a positive element positioned nearest an object plane (not shown) at which is located the original material to be copied onto film at the film plane. Light rays exit this element $L_1$ slightly converged to enter a second element $L_2$ spaced axially therefrom. This second element, a negative bi-concave element, redirects the light rays to a third element $L_3$. The latter positive element cooperates with an element $L_4$ for finally correcting and imaging the light rays onto the film plane FP, before which a planar piece of optical material $L_5$ such as a glass plate may be located as a cover plate.

In summary, the optical system of FIG. 1 according to this preferred embodiment is a 20mm (0.8118 in.) lens with an effective aperture number of f/2.8. The system has a half angle of field of 16° and is corrected over the entire field to the extent as diagrammatically seen in FIGS. 2a–2h, which figures graphically represent aberrations of the system.

The optical values of the optical system are as follows:

TABLE 1

EFL = .8118 in. (20.66mm)
½ Angle of Field = 15.95°

| Lens | Radii (In.) | Thickness (In.) | Spacing (In.) | V | $N_D$ |
|---|---|---|---|---|---|
| $L_1$ | $R_1$ = .5249 | $T_1$ = .140 | | | |
| | $R_2$ = − 13.8820 | | $S_1$ = .178 | 55.9 | 1.651 |
| $L_2$ | $R_3$ = − .4295 | $T_2$ = .039 | | | |
| | $R_4$ = + .5765 | | $S_2$ = .178 | 27.6 | 1.755 |
| $L_3$ | $R_5$ = − .4185 | $T_3$ = .109 | | | |
| | $R_6$ = − .3400 | | $S_3$ = .005 | 54.7 | 1.691 |
| $L_4$ | $R_7$ = .7135 | $T_4$ = .101 | | | |
| | $R_8$ = − .7135 | | | 54.7 | 1.691 |
| $L_5$ | $R_9$ = Inf. | $T_5$ = .125 | BFL= .697 inches to film plane | 64.5 | 1.517 |
| | $R_{10}$= Inf. | | | | |

In the above table, the first column lists the lens elements, numerically starting at the ray entrance side of the optical system. The second column lists the respective radii of surfaces of the elements. The third column lists the thickness of the respective elements. The fourth column lists the axial spacings between the respective elements and the nominal film plane. The fifth and sixth columns list respectively the refractive index and the dispersive index of the optical material. "EFL" is the effective focal length of the system. "Half Angle of Field" is one-half the angle between the continuation of the lens axis and a line from the nodal point of the lens to the most oblique point recorded on the film.

FIGS. 2a to 2h graphically represent various aberrations of this form of the optical system, as shown in FIG. 1 and having the design data recited in Table 1. FIG. 2a represents axial chromatic correction of the primary wavelengths forming rays on axis and lateral. FIG. 2b represents off axis aberrations of rays passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberrations by a full line and the offense-against-sine-condition by the dotted line. FIG. 2h represents the curvature of field with tangential curvature being shown in full line and sagittal curvature being shown in dashed line.

What is claimed is:

1. An economically manufacturable optical system of relatively large effective aperture for imaging an object at a significant reduction onto a film plane the system having substantially the following specifications:

TABLE 1

EFL = .8118 in (20.66mm)
½ Angle of Field = 15.95°

| Lens | Radii (In.) | Thickness (In.) | Spacing (In.) | V | $N_D$ |
|---|---|---|---|---|---|
| $L_1$ | $R_1 = .5249$ | $T_1 = .140$ | | 55.9 | 1.651 |
| | $R_2 = -13.8820$ | | | | |
| | | | $S_1 = .178$ | | |
| $L_2$ | $R_3 = -.4295$ | $T_2 = .039$ | | 27.6 | 1.755 |
| | $R_4 = +.5765$ | | | | |
| | | | $S_2 = .178$ | | |
| $L_3$ | $R_5 = -.4185$ | $T_3 = .109$ | | 54.7 | 1.691 |
| | $R_6 = -.3400$ | | | | |
| | | | $S_3 = .005$ | | |

TABLE 1-continued

EFL = .8118 in (20.66mm)
½ Angle of Field = 15.95°

| Lens | Radii (In.) | Thickness (In.) | Spacing (In.) | V | $N_D$ |
|---|---|---|---|---|---|
| $L_4$ | $R_7 = .7135$ | $T_4 = .101$ | | 54.7 | 1.691 |
| | $R_8 = -.7135$ | | | | |
| $L_5$ | $R_9 = $ Inf. | $T_5 = .125$ | | | |
| | $R_{10} = $ Inf. | | BFL = .697 inches to film plane | | | wherein the first column lists the lens elements numerically starting at the ray entrance side of the system; the second column lists the respective radii $R_1$ to $R_{10}$ of the elements; the third column lists the thicknesses of the respective element; the fourth column lists the axial spacings $S_1 - S_3$ between the respective elements; and the fifth and sixth column lists respectively the refractive index and the dispersive index of the optical material.

* * * * *